Patented Feb. 3, 1953

2,627,505

UNITED STATES PATENT OFFICE 2,627,505

RELATIVE HUMIDITY INDICATOR

Manfred E. Goodwin and Edgar A. Simpson, Baltimore, Md., assignors to The Davison Chemical Corporation, Baltimore, Md., a corporation of Maryland No Drawing. Application April 11, 1951,
Serial No. 220,526

19 Claims. (Cl. 252—408)

This invention relates to moisture indicators and has particular reference to compositions for indicating the relative humidity of a gaseous atmosphere.

A high humidity of the ambient atmosphere causes serious corrosion of metallic objects stored for long periods. This problem is especially serious in the storing of accurately machined articles such as airplane, and other machine, parts. One method of preventing corrosion that has been developed is to package the articles to be stored in a confined space with a desiccating material which reduces and controls the humidity of the confined air within limits where corrosion is not serious. However, such desiccating material will eventually adsorb enough water that it can no longer control the humidity of the ambient atmosphere within non-corrosive limits. To determine when this state occurs there has usually been stored within the same confined space a small amount of a relative humidity indicator consisting of silica gel which has been impregnated with cobalt chloride.

Indicators of this type change color when the atmosphere to which they are exposed passes through a certain range of relative humidity. The average silica gel has adsorptive properties such that the usual commercial indicator gel employing cobalt chloride has a color break when exposed to atmospheres having a relative humidity of about 20 to 30%. The color break at this relative humidity is very useful in indicating whether or not the atmosphere has a humidity low enough to prevent excessive rusting of iron and steel. In many instances, however, it is not necessary to maintain the humidity at such a low value, and for many purposes it is actually desirable to make sure that the atmosphere has a relative humidity well above 30%.

In those instances where the relative humidity may be above 30%, the use of an indicator changing color at a relative humidity of 30% or below will result in uneconomical use of the gel. Once the color change has taken place, no means are available for determining the condition of the atmosphere, and, for safety, the silica gel must be replaced with one which has been reactivated even though the gel has a large unused capacity for the adsorption of moisture. Since the per cent of water adsorbed by silica gel increased rapidly with the relative humidity of the atmosphere to which it is exposed, as shown by the Table I, it is clear that the most effective use of the silica gel can be obtained by allowing the atmosphere to reach the highest permissible relative humidity.

Table I

| Percent Relative Humidity | Percent Water Adsorption |
|---|---|
| 10 | 7 |
| 20 | 11 |
| 40 | 22 |
| 60 | 34 |
| 80 | 38 |
| 100 | 40 |

As described in Patent No. 2,460,071 of Paul B. Davis, silica gel impregnated with cobalt chloride will undergo a gradual color change between 20% R. H. and 30 and has no sharp break. It has also been found that by correlating the adsorption characteristics of the gel, its final moisture content and the degree of activation, an indicator could be obtained which would have a break point up to 60 R. H.; however, in no case was such break point sharp and clearly defined. Moreover, accurate control of the indicator to change color at a predetermined relative humidity is difficult with the indicators heretofore available.

It is an object of this invention to provide compositions for indicating the relative humidity of a gaseous atmosphere within predetermined limits.

A further object of this invention is to provide a relative humidity indicator having a color change in response to the relative humidity of the atmosphere to which it is exposed allowing most efficient use of desiccating materials employed to control the relative humidity of that atmosphere.

A further object of this invention is to provide a humidity indicator comprising a carrier associated with cobalt chloride, zinc chloride and a third metal chloride.

Another object of this invention is to provide a method for the preparation of relative humidity indicators which will show a sharp change in color within easily and accurately controlled predetermined relative humidity ranges.

It is also an object to provide a novel relative humidity indicator which will give an easily recognizable sharply defined color break in the vicinity of a relative humidity of about 40%.

With these and other objects in view, as will become apparent in the following detailed description, this invention resides in the preparation of a novel relative humidity indicator adapted to give a sharp color break at an accurately controlled predetermined relative humidity within the range of 30-80% relative humidity by impregnating a carrier with a solution of cobalt chloride, zinc chloride and a chloride of a third metal. The impregnated carrier is then dried to form the novel relative humidity indicator of this invention.

The cobalt chloride with which the carrier is impregnated imparts a change in color, generally from blue to pink when the relative humidity of the ambient atmosphere increases. The presence of zinc chloride in combination with the cobalt chloride sharpens the color break, thereby allowing it to be more easily recognized and accurately determined. Zinc chloride also reduces the humidity at which a cobalt chloride impregnated indicator changes color. The addition of a controlled amount of a third metal chloride during the impregnation of the carrier allows close control of the indicating properties of the final product, and increases the relative humidity at which the color change occurs.

The three component relative humidity indicator of this invention may be prepared to give a sharp change in color on a change of the relative humidity of the atmosphere through a narrowly defined predetermined relative humidity range. Control of the particular third metal chloride, as well as its amount and ratio to the other metal chlorides, provides a flexibility and wide range of operation of the indicators making them adaptable to many uses. The effect of changes in the metal chloride other than cobalt and zinc chlorides and changes in the concentrations and proportions of the chlorides on the indicating properties is strong and allows accurate reproduction of an indicator with a color break in a definite range.

Metal chlorides which are effective in controlling the properties of the relative humidity indicators are those of metals in Group IA and Group IIA of the periodic system of classification of the elements, and manganese. The preferred indicators adapted to show a color break at a relative humidity of 40% are prepared from silica gel impregnated with cobalt, zinc and magnesium chlorides. An indicator almost as satisfactory as the preferred indicator may be prepared from cobalt, zinc and manganese chlorides. Other chlorides that may be substituted for the magnesium chloride to provide indicators with sharp, easily controlled color breaks are those of calcium, lithium and sodium.

The chromatic salts are supported on carrier materials which will not interfere with or mask the color change of the chromatic compounds. The preferred carriers for use with this invention are adsorbent inorganic materials ordinarily used for the control of moisture within confined spaces. Of the inorganic adsorbent materials, silica gel is preferred both because of the more easily recognized and sharply defined color break and because of the smaller amount of chromatic metal chlorides required to produce a color intensity which is easily seen. The wide pore silica gels prepared according to conventional methods known to those skilled in the art may be employed but are not as satisfactory as carriers for the indicators as the standard silica gels because of the weakness of the colors of the gel and the slow change in color. The preferred and most satisfactory indicators prepared according to this invention employ the ordinary silica gel commonly used as an adsorbing medium as a support for the metal chlorides.

Other inorganic adsorbents which may be employed are activated alumina and acid treated clay. Both of these materials are widely used to control the humidity of gases. If activated alumina is employed as the carrier, higher concentrations of cobalt chloride must be used to impart a color of sufficient intensity to be easily observed, and, in general, the color break is not as well defined as when silica gel is used. Ordinarily acid activated clay becomes somewhat clumped during impregnation and because of its physical characteristics is not as desirable as either silica gel or alumina as a carrier.

In addition to the inorganic adsorbent carriers described above, the humidity indicators may also be prepared by impregnating certain adsorbent organic materials. For instance, an indicator may be prepared by impregnating Whatman filter paper with mixtures of cobalt chloride, zinc chloride and magnesium chloride. When filter paper is used as a carrier, an indicator having a good color break is obtained; however, in most instances, it will be necessary to use more cobalt chloride than when silica gel is used to obtain the desired color intensity.

As a specific example of a relative humidity indicator prepared according to this invention a standard silica gel is prepared by washing an acid reacting hydrogel with an acidic wash water at 150° F., drying and then activating at a temperature of 600° F., and then sizing to 6-16 mesh. This silica gel was then treated by exposing it to a humid atmosphere to saturate the gel to such an extent that upon contacting it with a liquid it would not disintegrate. After saturation to an approximate T. V. of about 30%, the silica gel was impregnated with a dilute solution of cobalt chloride, magnesium chloride and zinc chloride in sufficient concentration to insure upon the drying down of the solution a final concentration of 2:2.5:0.75%, respectively. An indicator having the chloride salts present on silica gel in the ratio of 2:2:1%, respectively, also gives a very sharply defined break at a relative humidity of 40%.

The silica gel impregnated with cobalt chloride, magnesium chloride and zinc chloride in the ratio of 2:2.5:0.75% as described above was then exposed to a constantly increasing relative humidity atmosphere. The color of the indicator changed from 10.0 P. P. 5/10 at a relative humidity of 30% to 5.0 P. 6/6 at the relative humidity of 40%. The color break at approximately 40% relative humidity was sharply defined and easily recognized. The measurement of the various colors in the foregoing description are according to the system of color notation devised by A. H. Munsell and published by Munsell Color Co., Inc. of Baltimore, Md. as the Munsell Book of Color, abridged edition, revised 1942.

The relative humidity range at which the color break occurs can be controlled by controlling the proportions of the several metallic chlorides of which the carrier is impregnated. In Table II, the effect of concentrations of cobalt chloride, zinc chloride and magnesium chloride on the humidity at which the color break occurs for indicators prepared from silica gel, is illustrated.

*Table II*

| Percent CoCl₂ | Percent ZnCl₂ | Percent MgCl₂ | Percent R. H. at color break |
|---|---|---|---|
| 2 | 1 | 2 | 40 |
| 4 | 1 | ¼ | 40 |
| 2 | 0.75 | 2.5 | 40 |
| 4 | 0.75 | 5.0 | 50 |
| 4 | 0.75 | 3.0 | 60 |
| 5 | 1.0 | 4.0 | 70 |
| 30 | 5.0 | 5.0 | 80 |
| 2.0 | .125 | .125 | 50 |

Chlorides and metals other than magnesium may also be used in combination with cobalt chloride and zinc chloride, in the preparation of relative humidity indicators, according to this invention. Manganese chloride is especially effective and provides an indicator comparable as those employing magnesium chloride in combination with the other two chlorides. Calcium chloride may be substituted for the magnesium chloride in the preferred composition having a ratio of 2% cobalt chloride, 0.75% zinc chloride and 2½ magnesium chloride to produce an indicator changing color at a relative humidity of 40% but the color break is not quite as sharp as when magnesium chloride is employed. Indicating properties of indicators prepared from the ordinary silica gel of commerce, cobalt chloride, zinc chloride and a third metallic chloride other than magnesium chloride are illustrated in Table III.

*Table III*

| Percent CoCl₂ | Percent Zn | Percent Metal Chloride | Percent R. H. |
|---|---|---|---|
| 2.0 | 0.75 | 5.0 Ca | 40 |
| 2.0 | 0.75 | 5.0 Na | 30 |
| 2.0 | 0.75 | 5.0 Li | 30 |
| 4 | 1.0 | 2.0 Mn | 50 |
| 4 | .25 | .25 Mn | 60 |

Relative humidity indicators especially suitable for the indication of higher relative humidities may be prepared with alumina as a carrier. As mentioned above, higher concentrations of cobalt chloride are required to provide the desired color intensity and generally at least 5–10% of cobalt chloride is necessary. Indicators changing color in the range of relative humidities of 60–70% may be prepared from activated alumina impregnated with 10% cobalt chloride, 2% zinc chloride and 4% magnesium chloride. A slightly better color break, also in the range of 60–70% relative humidity, may be obtained from activated alumina impregnated with 10% cobalt chloride, 4% zinc chloride and 4% magnesium chloride.

An indicator providing a very sharp color break in the high humidity range of 60% relative humidity may be prepared from Whatman filter paper impregnated with 4% cobalt chloride, 2% zinc chloride and 2% magnesium chloride. While higher concentrations of chromatic salts are required when the filter paper is the carrier than when silica gel is the carrier, the color break of the impregnated paper indicator is very easily recognized.

A relative humidity indicator which will change color at a desired predetermined relative humidity of 30–80% may be prepared according to the method described herein. The properties of the indicator may be easily and closely controlled within narrow ranges. Apparently the effect of the proportions of the various chlorides of metals exert a stronger controlling effect than the absorptive properties of the carrier. For instance, if an indicator is prepared in the manner described, no appreciable change in the properties of the indicator is noticed if the temperature of activation of the silica gel is changed from 525 to 900° F.

We claim:

1. A relative humidity indicator changing color in the range of 30 to 80% R. H., comprising a major proportion of a carrier impregnated with cobalt chloride, zinc chloride and a chloride of a metal selected from a group consisting of manganese and groups IA and IIA of the periodic system, said chlorides being present in amounts sufficient to indicate relative humidities of 30 to 80%.

2. A relative humidity indicator, according to claim 1, wherein the carrier is an inorganic moisture adsorbent material.

3. A relative humidity indicator, having a sharp color break at a relative humidity ranging from about 30 to 80%, comprising an adsorptive inorganic carrier impregnated with about 0.5 to about 30% of cobalt chloride, about 0.125 to about 5% of zinc chloride and about 0.125 to about 5% of a chloride of a metal selected from the group consisting of manganese, and groups IA and IIA of the periodic system.

4. A relative humidity indicator having a sharp color break at a relative humidity ranging from about 30 to 80%, comprising an adsorptive carrier impregnated with about 0.5 to about 30% of cobalt chloride, about 0.125 to about 5% of zinc chloride and about 0.125 to about 5% of a chloride of a metal selected from the group consisting of manganese and groups IA and IIA of the periodic system.

5. A relative humidity indicator having a sharp color break at a relative humidity ranging from about 30 to 80%, comprising an adsorptive siliceous carrier impregnated with a minor proportion of cobalt chloride, zinc chloride and a chloride of a metal selected from a group consisting of manganese and groups IA and IIA of the periodic system, said chlorides being present in amounts sufficient to indicate relative humidities of 30 to 80%.

6. A relative humidity indicator having a sharp color break at a relative humidity ranging from about 30 to 80%, comprising silica gel impregnated with a minor proportion of cobalt chloride, zinc chloride and a chloride of a metal selected from a group consisting of manganese and groups IA and IIA of the periodic system, said chlorides being present in amounts sufficient to indicate relative humidities of 30 to 80%.

7. A relative humidity indicator having a sharp color break at a relative humidity ranging from about 30 to 80%, comprising silica gel impregnated with about 0.125 to about 5% of a chloride of a metal selected from the group consisting of manganese and groups IA and IIA of the periodic system, about 0.5 to about 30% of cobalt chloride and about 0.125 to about 5% of zinc chloride.

8. A relative humidity indicator having a sharp color break at a relative humidity ranging from about 30 to 80%, comprising silica gel impregnated with a minor proportion of cobalt chloride, zinc chloride and a chloride of a metal of group IA of the periodic table, said chlorides being present in amounts sufficient to indicate relative humidities of 30 to 80%.

9. A relative humidity indicator having a sharp color break at a relative humidity ranging from about 30 to 80%, comprising silica gel and a minor proportion of cobalt chloride, zinc chloride and a chloride of a metal of group IIA of the periodic table, said chlorides being present in amounts sufficient to indicate relative humidities of 30 to 80%.

10. A relative humidity indicator having a sharp color break at a relative humidity ranging from about 30 to 80%, comprising silica gel and a minor proportion of cobalt chloride, zinc chloride and magnesium chloride said cobalt chloride, zinc chloride and magnesium chloride being present in amounts sufficient to indicate relative humidities of 30 to 80%.

11. A relative humidity indicator having a sharp color break at a relative humidity ranging from about 30 to 80%, comprising silica gel and a minor proportion of cobalt chloride, zinc chloride and manganese chloride, said cobalt chloride, zinc chloride and manganese chloride being present in amounts sufficient to indicate relative humidities of 30 to 80%.

12. A relative humidity indicator having a sharp color break when exposed to an atmosphere of approximately 40% relative humidity, comprising silica gel impregnated with 2% by weight cobalt chloride, .75% by weight zinc chloride and 2.5% by weight magnesium chloride.

13. A relative humidity indicator adapted to change color when exposed to atmospheres having a relative humidity of 30–80%, comprising a major proportion of acid activated clay impregnated with a minor proportion of cobalt chloride and zinc chloride, and a minor proportion of a chloride of a metal selected from a group consisting of manganese and groups IA and IIA of the periodic system, said chlorides being present in amounts sufficient to indicate relative humidities of 30 to 80%.

14. A relative humidity indicator adapted to change color when exposed to atmospheres having a relative humidity of 30–80%, comprising a major proportion of activated alumina impregnated with a minor proportion of cobalt chloride and zinc chloride, and a minor proportion of a chloride of a metal selected from a group consisting of manganese and groups IA and IIA of the periodic system, said chlorides being present in amounts sufficient to indicate relative humidities of 30 to 80%.

15. A relative humidity indicator adapted to give a well defined color break in the range of relative humidities of 30 to 80%, comprising a major proportion of activated alumina impregnated with about 0.5 to 30% cobalt chloride, about 0.125 to about 5% zinc chloride, and about 0.125 to about 5% of a chloride of a metal selected from the group consisting of manganese and groups IA and IIA of the periodic system.

16. A method of preparing a relative humidity indicator adapted to change color sharply at a predetermined relative humidity in the range of 30 to 80% comprising impregnating an inorganic adsorptive carrier with minor proportions of cobalt chloride, zinc chloride and a chloride of a metal selected from the group consisting of manganese and groups IA and IIA of the periodic system, and drying the impregnated gel, the proportions of the chlorides being controlled to control the point at which the color change of the indicator occurs, and the amounts of the chlorides with which the gel is impregnated being sufficient to indicate relative humidities of 30 to 80%.

17. A relative humidity indicator having a sharp color break at a relative humidity ranging from about 30 to 80%, comprising an inorganic adsorptive carrier impregnated with about 0.5 to about 30% of cobalt chloride, about 0.125 to 5% of zinc chloride and about 0.125 to about 5% of magnesium chloride.

18. A relative humidity indicator having a sharp color break at a relative humidity ranging from about 30 to 80% comprising silica gel impregnated with about 0.5 to about 30% of cobalt chloride, about 0.125% to 5% of zinc chloride and about 0.125 to about 5% of magnesium chloride.

19. A relative humidity indicator having a sharp color break at a relative humidity ranging from about 30 to 80% comprising an inorganic adsorptive carrier impregnated with about 0.5 to about 30% cobalt chloride, about 0.125 to about 5% zinc chloride and about 0.125 to about 5% manganese chloride.

MANFRED E. GOODWIN.
EDGAR A. SIMPSON.

REFERENCES CITED

The following references are of record in the file of this patent:

UNITED STATES PATENTS

| Number | Name | Date |
|---|---|---|
| 2,460,071 | Davis et al. | Jan. 25, 1949 |
| 2,526,938 | Davis et al. | Oct. 24, 1950 |
| 2,580,737 | Davis et al. | Jan. 1, 1952 |